US009245571B2

(12) United States Patent
Nishigata

(10) Patent No.: US 9,245,571 B2
(45) Date of Patent: Jan. 26, 2016

(54) OPTICAL DISC DEVICE, CONTROL METHOD THEREOF, PROGRAM, AND INFORMATION STORAGE MEDIUM

(71) Applicant: Sony Computer Entertainment Inc., Tokyo (JP)

(72) Inventor: Naoyuki Nishigata, Chiba (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 14/525,567

(22) Filed: Oct. 28, 2014

(65) Prior Publication Data

US 2015/0131423 A1    May 14, 2015

(30) Foreign Application Priority Data

Nov. 13, 2013   (JP) ................. 2013-235488

(51) Int. Cl.
| | |
|---|---|
| *G11B 7/00* | (2006.01) |
| *G11B 7/085* | (2006.01) |
| *G11B 7/0045* | (2006.01) |
| *G11B 7/1392* | (2012.01) |
| *G11B 7/09* | (2006.01) |

(52) U.S. Cl.
CPC ............ *G11B 7/13927* (2013.01); *G11B 7/094* (2013.01); *G11B 7/0925* (2013.01); *G11B 7/0941* (2013.01); *G11B 7/0948* (2013.01); *G11B 7/1392* (2013.01); *G11B 7/13925* (2013.01)

(58) Field of Classification Search
CPC .. G11B 7/1376; G11B 7/1378; G11B 7/1392; G11B 7/13925; G11B 7/13927; G11B 7/00458; G11B 7/0908; G11B 7/0945; G11B 7/1369; G02B 27/00; G02B 27/0025; G02B 27/0068; G02B 2027/011; G02B 13/005
See application file for complete search history.

(56) References Cited

U.S. PATENT DOCUMENTS

| | | | | |
|---|---|---|---|---|
| 2004/0027938 | A1* | 2/2004 | Sasaki et al. | ............... 369/44.32 |
| 2005/0141363 | A1* | 6/2005 | Shimamoto et al. | ........ 369/44.29 |
| 2006/0164949 | A1* | 7/2006 | Sagara | ................ G11B 7/0908 369/106 |
| 2010/0061214 | A1* | 3/2010 | Orlic et al. | .................... 369/103 |
| 2010/0157767 | A1* | 6/2010 | Hsu et al. | ................... 369/53.42 |

FOREIGN PATENT DOCUMENTS

| | | |
|---|---|---|
| JP | 2003016660 A | 1/2003 |
| JP | 2004095106 A | 3/2004 |
| JP | 2009283103 A | 12/2009 |

OTHER PUBLICATIONS

Office Action for corresponding Japanese Patent Application No. 2013-235488, dated Sep. 29, 2015.

* cited by examiner

*Primary Examiner* — Wayne Young
*Assistant Examiner* — Dionne Pendleton
(74) *Attorney, Agent, or Firm* — Matthew B. Dernier, Esq.

(57) ABSTRACT

An optical disc device that reads information recorded in an optical disc medium includes an objective lens that focuses light on the optical disc medium, a spherical aberration correction mechanism that changes an amount of spherical aberration of the objective lens according to a setting value of a predetermined parameter, and an evaluation value measurement section that measures an evaluation value indicating the accuracy of reading of information from the optical disc medium. The optical disc device further includes a control section that executes adjustment processing in which the control section carries out plural times of measurement of the evaluation value by the evaluation value measurement section concurrently with changing the amount of spherical aberration of the objective lens by the spherical aberration correction mechanism and calculates an optimum setting value of the parameter based on plural evaluation values obtained by the plural times of measurement.

7 Claims, 7 Drawing Sheets

TO SIGNAL OUTPUT CIRCUIT 17

OPTICAL DISC DEVICE, CONTROL METHOD THEREOF, PROGRAM, AND INFORMATION STORAGE MEDIUM

BACKGROUND

The present disclosure relates to an optical disc device that reads information recorded in optical disc medium such as CD, DVD, and Blu-ray Disc (registered trademark), a control method thereof, a program, and an information storage medium.

In recent years, various kinds of optical disc medium are used as information recording medium. To read information recorded in such optical disc medium, an optical disc device is used. The optical disc device includes an objective lens that focuses light on the optical disc medium. The optical disc device receives reflected light obtained by reflection of the light focused by the objective lens by the optical disc medium, to thereby read information recorded in the optical disc medium.

When the optical disc device reads information from the optical disc medium, spherical aberration correction of the objective lens needs to be carried out. For example, in an optical pick-up, a collimator lens is provided in order to correct the spherical aberration of the objective lens that focuses light on the optical disc medium. By properly adjusting a position of this collimator lens, the spherical aberration of the objective lens can be corrected and the light from the objective lens can be focused on the optical disc medium with high accuracy.

The optical disc device internally manages the position of the collimator lens as a value of a parameter called the SA parameter. An optimum value of this SA parameter varies depending on the kind, individual difference, and so forth of the optical disc medium as a reading target. Therefore, when an optical disc medium is newly set in the optical disc device, the device executes adjustment processing of the SA parameter before starting reading of information (refer to e.g. Japanese Patent Laid-Open No. 2003-16660). This adjustment processing is the following control. Specifically, first the optical disc device changes a setting value of the SA parameter in a settable range. Furthermore, the optical disc device attempts reading of information from the medium in each of three or more states in which different setting values are set, and evaluates an accuracy of information reading at the time. Then, the optical disc device calculates such a setting value of the SA parameter as to allow enhancement in the accuracy of information reading by using an evaluation values of the reading accuracy obtained corresponding to each of the plural setting values, and sets this calculated value as the value of the SA parameter.

SUMMARY

The optimum value of the SA parameter is not determined only by an individual difference of the optical disc medium. For example, even with the same optical disc medium, the optimum value of the SA parameter differs for each data recording layer in the case of an optical disc medium having plural data recording layers. Furthermore, because of temperature-dependent characteristics of the objective lens, the optimum value of the SA parameter changes also depending on temperature change of the optical disc device during use. Therefore, the optical disc device should recalculate the optimum value of the SA parameter at various kinds of timing, such as when the data recording layer as the reading target is changed. However, it takes a certain amount of time to execute adjustment processing of the SA parameter like the above-described one. Therefore, the user is forced to wait if the adjustment processing is executed every time the data recording layer as the reading target is changed and in other occasions.

The present disclosure has been made in view of the above problems. There is a need for the present disclosure to provide an optical disc device that can execute spherical aberration correction of an objective lens in a comparatively short time, a control method thereof, a program, and an information storage medium.

According to an embodiment of the present disclosure, there is provided an optical disc device that reads information recorded in an optical disc medium. The optical disc device includes an objective lens configured to focus light on the optical disc medium, a spherical aberration correction mechanism configured to change an amount of spherical aberration of the objective lens according to a setting value of a predetermined parameter, and an evaluation value measurement section configured to measure an evaluation value indicating an accuracy of reading of information from the optical disc medium. The optical disc device further includes a control section configured to execute adjustment processing in which the control section carries out a plurality of times of measurement of the evaluation value by the evaluation value measurement section concurrently with changing the amount of spherical aberration of the objective lens by the spherical aberration correction mechanism and calculates an optimum setting value of the parameter based on a plurality of evaluation values obtained by the plurality of times of measurement.

According to another embodiment of the present disclosure, there is provided a control method of an optical disc device including an objective lens that focuses light on an optical disc medium, a spherical aberration correction mechanism that changes an amount of spherical aberration of the objective lens according to a setting value of a predetermined parameter, and an evaluation value measurement section that measures an evaluation value indicating an accuracy of reading of information from the optical disc medium. The control method includes carrying out a plurality of times of measurement of the evaluation value by the evaluation value measurement section concurrently with changing the amount of spherical aberration of the objective lens by the spherical aberration correction mechanism, and executing adjustment processing in which an optimum setting value of the parameter is calculated based on a plurality of evaluation values obtained by the plurality of times of measurement.

According to another embodiment of the present disclosure, there is provided a program controlling an optical disc device including an objective lens that focuses light on an optical disc medium, a spherical aberration correction mechanism that changes an amount of spherical aberration of the objective lens according to a setting value of a predetermined parameter, and an evaluation value measurement section that measures an evaluation value indicating an accuracy of reading of information from the optical disc medium. The program for a computer, includes carrying out a plurality of times of measurement of the evaluation value by the evaluation value measurement section concurrently with changing the amount of spherical aberration of the objective lens by the spherical aberration correction mechanism, and executing adjustment processing in which an optimum setting value of the parameter is calculated based on a plurality of evaluation values obtained by the plurality of times of measurement.

According to further another embodiment of the present disclosure, there is provided a computer-readable information storage medium for a program. The program controlling an optical disc device includes an objective lens that focuses light on an optical disc medium, a spherical aberration correction mechanism that changes an amount of spherical aberration of the objective lens according to a setting value of a predetermined parameter, and an evaluation value measurement section that measures an evaluation value indicating an accuracy of reading of information from the optical disc medium. The program for a computer, includes carrying out a plurality of times of measurement of the evaluation value by the evaluation value measurement section concurrently with changing the amount of spherical aberration of the objective lens by the spherical aberration correction mechanism, and executing adjustment processing in which an optimum setting value of the parameter is calculated based on a plurality of evaluation values obtained by the plurality of times of measurement.

DETAILED DESCRIPTION OF THE PREFERRED EMBODIMENTS

Embodiments of the present disclosure will be described in detail below based on the drawings.

Figure 1:
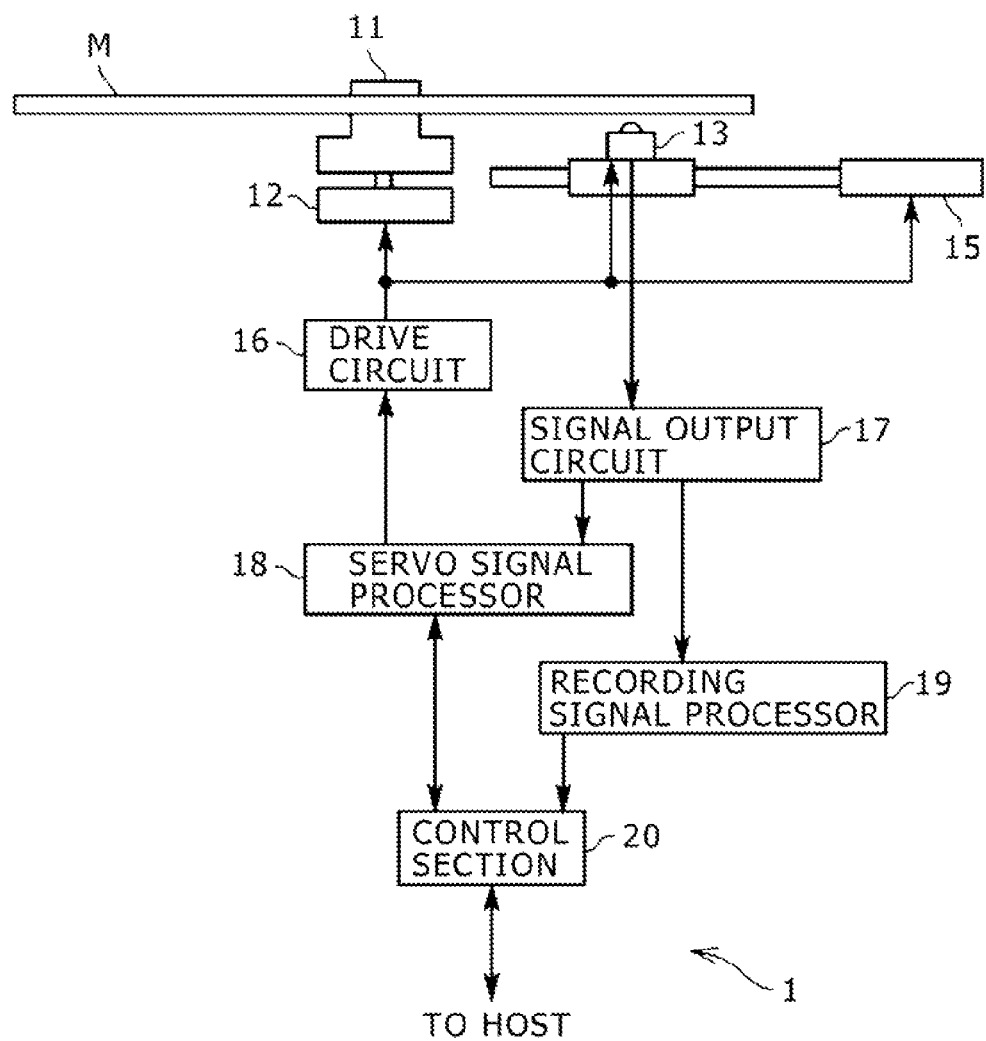
FIG. 1 is a block diagram showing a configuration example of an optical disc device according to an embodiment of the present disclosure.

An optical disc device 1 according to one embodiment of the present disclosure is a device that reads information recorded in an optical disc medium. As shown in FIG. 1, it includes a medium supporter 11, a spindle motor 12, an optical pick-up 13, a feed motor 15, a drive circuit 16, a signal output circuit 17, a servo signal processor 18, a recording signal processor 19, and a control section 20.

An optical disc medium M as a target of information reading by the optical disc device 1 is formed by stacking a data recording layer in which information is recorded and a protective layer that protects the data recording layer from both sides thereof. Hereinafter, a surface of the data recording layer on which data is recorded will be referred to as a signal surface. The optical disc device 1 may be so configured as to be capable of not only reading information recorded in the optical disc medium M but writing information to the optical disc medium M. Furthermore, the optical disc device 1 may be so configured as to be capable of reading information recorded in plural kinds of optical disc medium M such as CD, DVD, and Blu-ray Disc.

The medium supporter 11 rotatably supports the optical disc medium M. This medium supporter 11 rotates the optical disc medium M by power transmitted from the spindle motor 12.

Figure 2:
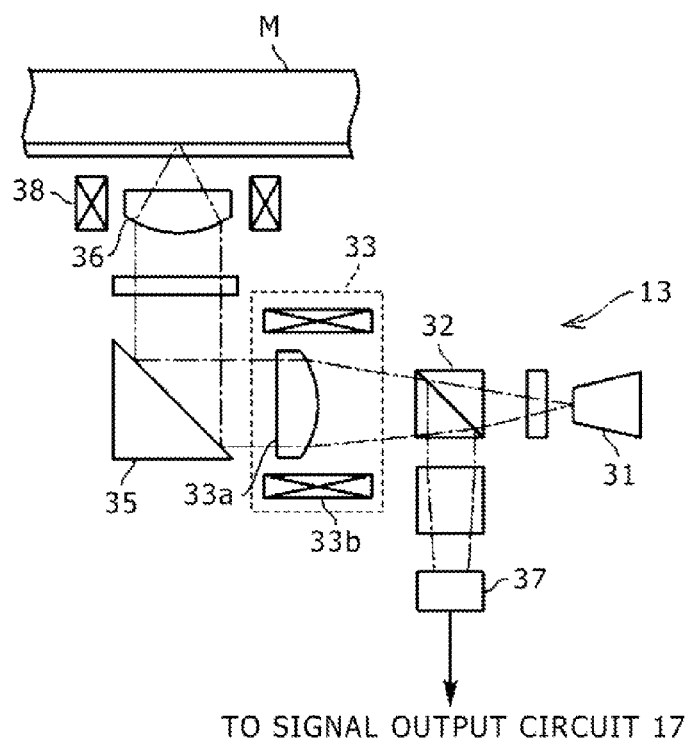
FIG. 2 is an outline diagram showing an internal configuration example of an optical pick-up of the optical disc device according to the embodiment of the present disclosure.

The optical pick-up 13 radiates laser light to the optical disc medium M and detects reflected light obtained by reflection of the radiated light by the optical disc medium M. Furthermore, the optical pick-up 13 outputs an output signal according to the detected reflected light. FIG. 2 is a diagram showing one example of an internal configuration of the optical pick-up 13. In the example of this diagram, the optical pick-up 13 includes a light emitting element 31, a polarizing beam splitter 32, a spherical aberration correction mechanism 33, a rising mirror 35, an objective lens 36, a photodetector 37, and an objective lens driver 38. The spherical aberration correction mechanism 33 includes a collimator lens 33a and a collimator lens driver 33b.

The light emitting element 31 is a semiconductor laser element that outputs laser light with a predetermined wavelength. Output light emitted from the light emitting element 31 passes through the polarizing beam splitter 32 and the collimator lens 33a and then is reflected by the rising mirror 35. The output light reflected by the rising mirror 35 is focused on a position separate from the objective lens 36 by a focal length F by the objective lens 36, and is reflected by the optical disc medium M.

The reflected light arising from reflection by the optical disc medium M passes through the objective lens 36 and then is reflected by the rising mirror 35 to be guided toward the photodetector 37 by the polarizing beam splitter 32. The photodetector 37 is formed of plural light receiving elements. When the reflected light from the optical disc medium M reaches these light receiving elements, the photodetector 37 outputs a signal according to an intensity of the light received by each of the plural light receiving elements as an output signal.

The spherical aberration correction mechanism 33 is a mechanism correcting a spherical aberration of the objective lens 36. The collimator lens driver 33b is formed of an actuator or the like and anteroposteriorly drives the collimator lens 33a along an optical axis direction of the laser light. A movement of the collimator lens 33a along the optical axis direction by the collimator lens driver 33b changes an amount of spherical aberration of the objective lens 36. By properly adjusting a position of the collimator lens 33a, the spherical aberration of the objective lens 36 can be corrected.

The objective lens driver 38 is formed of an actuator or the like and moves the objective lens 36 in two directions, a radial direction of the optical disc medium M (hereinafter, referred to as a tracking direction) and a direction perpendicular to a surface of the optical disc medium M (hereinafter, referred to as a focus direction). A movement of the objective lens 36 along the focus direction by the objective lens driver 38 changes a distance from the objective lens 36 to the surface of the optical disc medium M.

The feed motor 15 moves the whole of the optical pick-up 13 along the tracking direction. The driving by this feed motor 15 enables the optical pick-up 13 to move from a position around a center of the optical disc medium M to a position around an outer circumference.

The drive circuit 16 outputs drive signals to drive the spindle motor 12, the feed motor 15, the collimator lens driver 33b, and the objective lens driver 38 in accordance with a control signal input from the servo signal processor 18. A rotational speed of the spindle motor 12 changes according to this drive signal from the drive circuit 16. This controls a rotational speed of the optical disc medium M. Furthermore, through the driving of the objective lens driver 38 and the feed motor 15 according to this drive signal from the drive circuit 16, a distance of the objective lens 36 from a medium rotation axis and the distance of the objective lens 36 from the medium surface are controlled.

The signal output circuit 17, the servo signal processor 18, the recording signal processor 19, and the control section 20 are implemented by e.g. an analog circuit that processes an analog signal output from the optical pick-up 13, an analog/digital (A/D) converter that converts the analog signal to a digital signal, a digital signal processor (DSP) that processes the digital signal obtained by this conversion, a microcomputer, and so forth.

The signal output circuit 17 outputs various kinds of signals based on an analog signal output by the photodetector 37. Specifically, the signal output circuit 17 outputs a focus error signal (FE signal), a tracking error signal (TE signal), an RF signal for data reproduction, and so forth by performing calculation on an amplified signal obtained by amplifying the output signal from each light receiving element by a given gain (amplification factor). The focus error signal is a signal representing an offset in the focus direction between a signal surface of the optical disc medium M and a focus position of the objective lens 36. The tracking error signal is a signal representing an offset in the tracking direction between the focus position of the objective lens 36 and a track position of the optical disc medium M. The signal output circuit 17 outputs also a pull-in signal (PI signal) obtained by amplifying the output signals of the plural light receiving elements and performing full addition.

The servo signal processor 18 generates various kinds of signals for servo control based on the PI signal, the FE signal, the TE signal, and so forth output by the signal output circuit 17 and outputs the signals to the control section 20. Furthermore, the servo signal processor 18 outputs a control signal driving the objective lens driver 38, the feed motor 15, and the spindle motor 12 to the drive circuit 16 in accordance with an instruction input from the control section 20.

In particular, the servo signal processor 18 carries out servo control in response to an instruction from the control section 20. Specifically, when an instruction to start servo control is input from the control section 20 to the servo signal processor 18, the servo signal processor 18 carries out focus servo control of adjusting the position of the objective lens 36 in the focus direction by outputting the control signal to control the objective lens driver 38 according to the FE signal input from the signal output circuit 17. This keeps a state in which the focus of the objective lens 36 corresponds with the signal surface of the optical disc medium M. Furthermore, the servo signal processor 18 carries out tracking servo control of changing the position of the objective lens 36 in the tracking direction by outputting the control signal to control the objective lens driver 38 according to the TE signal input from the signal output circuit 17. Due to this, the objective lens 36 moves relative to the medium surface in such a manner that the focus of the objective lens 36 follows a track in a data recording layer. In this manner, the position of the objective lens 36 relative to the surface of the optical disc medium M is controlled by the servo control carried out by the servo signal processor 18. Therefore, a state in which the optical pick-up 13 can read information from the optical disc medium M is kept and information reading is carried out while this state is kept.

The recording signal processor 19 demodulates a digital signal indicating information recorded in the optical disc medium M based on the RF signal output by the signal output circuit 17 and outputs the demodulated signal to the control section 20. Furthermore, the recording signal processor 19 calculates an evaluation value (RF amplitude, jitter value, etc.) relating to an accuracy of reading of information recorded in the optical disc medium M by the optical pick-up 13 and outputs it to the control section 20.

The control section 20 is formed of e.g. a microcomputer and includes an execution module and a storage element. A program to be executed and various kinds of parameters are stored in the storage element of this control section 20 and the execution module executes processing in accordance with the program stored in this storage element. In particular, in the present embodiment, the control section 20 executes adjustment processing of an SA parameter when information is read from the optical disc medium M. The SA parameter is a parameter relating to spherical aberration correction of the objective lens 36. When a setting value of the SA parameter is updated, the control section 20 controls the collimator lens driver 33b to move the collimator lens 33a to a position corresponding to this setting value. Therefore, the spherical aberration of the objective lens 36 is corrected. The adjustment processing of the SA parameter will be described later.

The control section 20 is connected to a host such as a personal computer, a home game console, or a video decoder and, in response to a request from the host, outputs a command to drive the feed motor 15 or the objective lens driver 38 to the servo signal processor 18 to move the focus of the objective lens 36 (i.e. position of information reading on the optical disc medium M) to a desired position on the optical disc medium M. In conjunction with this, the control section 20 outputs a command to change the rotational speed of the spindle motor 12 to the servo signal processor 18 to adjust the rotational speed of the optical disc medium M. Then, the control section 20 outputs, to the host side, a signal that is output by the recording signal processor 19 in this state and arises from demodulation from a signal read from the optical disc medium M.

Before reading information from the optical disc medium M, the optical disc device 1 executes adjustment processing of calculating a desired setting value of the SA parameter. Specifically, the optical disc device 1 calculates a value of the SA parameter with which it is expected that information recorded in the optical disc medium M can be accurately read out (hereinafter, this value will be referred to as an optimum value So) by the adjustment processing with use of the spherical aberration correction mechanism 33. Then, the optical disc device 1 sets the optimum value So calculated by this adjustment processing for the SA parameter and carries out reading operation under an operating condition according to the set optimum value So. This allows the optical disc device 1 to accurately read information from the optical disc medium M without causing a reading error. This adjustment processing of the SA parameter is executed for example when the optical disc medium M is newly set in the optical disc device 1. This is because the optimum setting value of the SA parameter differs depending on the kind, individual difference, and so forth of the optical disc medium M.

Figure 3:
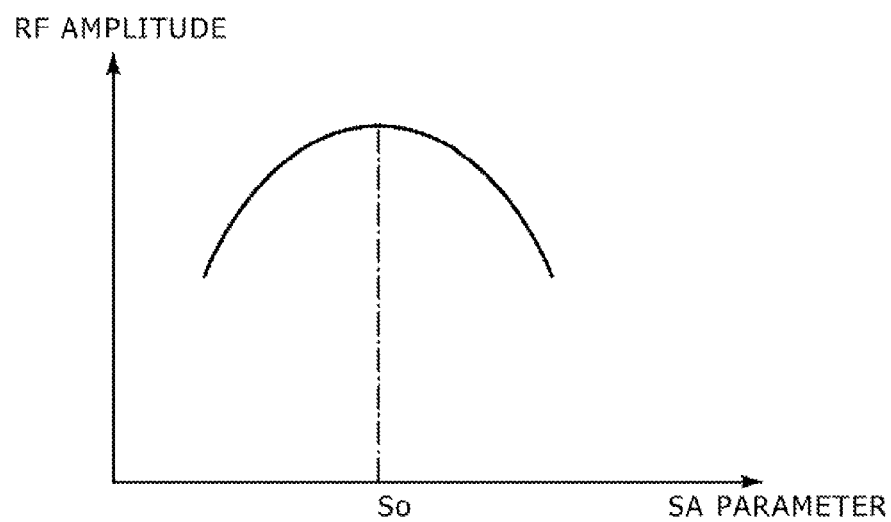
FIG. 3 is a diagram showing one example of a relationship between a setting value of an SA parameter and an evaluation value.

The basic concept of the adjustment processing will be described below. When the SA parameter is changed, the amount of spherical aberration correction of the objective lens 36 changes and the accuracy of information reading from the optical disc medium M also changes depending on the degree of the change. A relationship that can be approximated by a quadratic curve holds between the setting value of the SA parameter and the evaluation value of the reading accuracy. In the following description, the amplitude value of the RF signal (RF amplitude) is used as the evaluation value. FIG. 3 is a graph showing one example of a relationship between the setting value of the SA parameter and the RF amplitude. In this diagram, an abscissa indicates the setting value of the SA parameter and an ordinate indicates the RF amplitude. Because the RF amplitude is used as the evaluation value here, this graph shows that a reading quality is higher when the value of the RF amplitude is larger. In FIG. 3, the relationship between the setting value of the SA parameter and the RF amplitude is represented by an upward-convex parabola and the optimum value So is a value on the abscissa corresponding to a vertex of the parabola.

Therefore, the optical disc device 1 measures the evaluation value in the states in each of which the SA parameter is set to a respective one of at least three setting values different from each other as sample data. When at least three sample data are measured, the optical disc device 1 calculates a quadratic curve that approximates these sample data by a method such as the least squares method and calculates the value of the SA parameter corresponding to the vertex position of the curve as the optimum value So. After the adjustment processing is executed in this manner, the optical disc device 1 drives the collimator lens driver 33b based on this calculated optimum value So to adjust the position of the collimator lens 33a.

The optical disc device 1 according to the present embodiment executes the adjustment processing of the SA parameter described above not only when the new optical disc medium M is set in the optical disc device 1 but also when the data recording layer as the reading target is changed for example. This is because, when the optical disc device 1 is continuously used, lens characteristics of the objective lens 36 change due to temperature rise in the device and so forth and a deviation is caused between the present optimum value So of the SA parameter and the value initially set by the adjustment processing.

In the following, based on an assumption that the optical disc medium M includes two data recording layers, control carried out when the optical disc device 1 changes the data recording layer as the reading target will be described. Hereinafter, the control to change the data recording layer as the reading target by the optical disc device 1 will be referred to as a data recording layer change control. Furthermore, of the two data recording layers, a data recording surface of the data recording layer remoter from the optical pick-up 13 will be referred to as a first signal surface and a data recording surface of the data recording layer closer to the optical pick-up 13 will be referred to as a second signal surface. The data recording layer change control is control until a transition is made from a state in which the objective lens 36 is focused on one of the first signal surface and the second signal surface to a state in which it is focused on the other and information reading from the signal surface on which the lens is newly focused is started.

Figure 4:
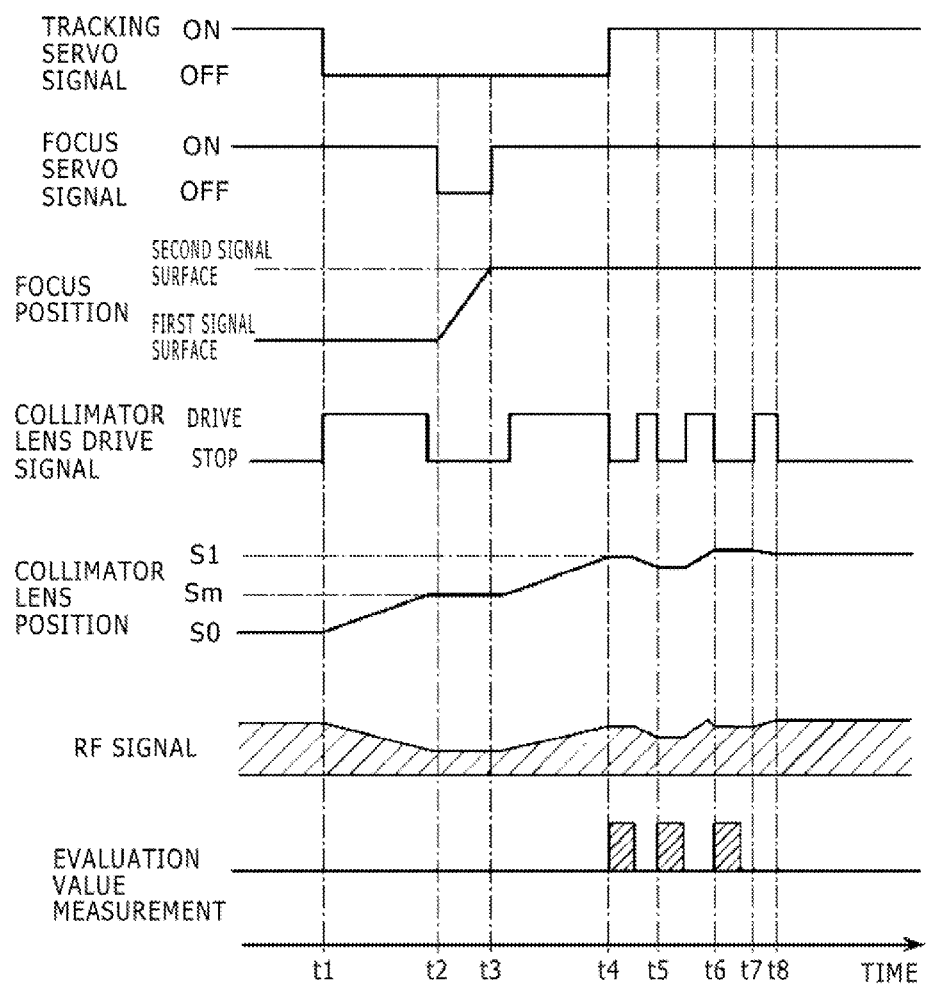
FIG. 4 is a diagram showing one example of data recording layer change control of a related art.

First, for comparison, a specific example of the data recording layer change control in an optical disc device of a related art will be described by using FIG. 4. FIG. 4 is a diagram explaining contents of the data recording layer change control of the related art and the abscissa indicates a time course. In this example, a case of changing a focus position from the first signal surface to the second signal surface will be described.

At the start of the data recording layer change control, first the control section 20 turns off a tracking servo signal (time t1). This causes the servo signal processor 18 to end tracking servo control carried out thus far. Subsequently, the control section 20 changes the setting value of the SA parameter from a first reference value S0 to an intermediate value Sm. The first reference value S0 is a setting value of the SA parameter set when information is read from the first signal surface and may be the optimum value of the SA parameter decided by initial adjustment processing in advance. Alternatively, it may be an initial value stored in the storage element of the control section 20 in advance. A reference value of the SA parameter set when information is read from the second signal surface will be described as a second reference value S1. The second reference value S1 may also be decided similarly to the first reference value S0. The intermediate value Sm is a value between the first reference value S0 and the second reference value S1 and is a value corresponding to an initial position of the collimator lens 33a. This intermediate value Sm may be a value stored in the storage element of the control section 20 in advance. In order to perform a focus jump to be described later, this intermediate value Sm is set to a value with which an S-shaped waveform of the FE signal can be detected whether the objective lens 36 is focused on the first signal surface or the second signal surface.

When the setting value of the SA parameter is changed to the intermediate value Sm, in response to this, the collimator lens driver 33b moves the position of the collimator lens 33a to a position corresponding to the intermediate value Sm (initial position). After the end of the movement of the collimator lens 33a, the control section 20 controls the objective lens driver 38 to start a focus jump (time t2). This focus jump is processing of making a transition from the state in which the objective lens 36 is focused on the first signal surface to the state in which it is focused on the second signal surface. When an S-shaped waveform indicating that the lens is focused on the second signal surface appears in the FE signal in the execution of the focus jump, the control section 20 turns on the focus servo signal (time t3). This causes the servo signal processor 18 to start the focus servo control to keep the state in which the objective lens 36 is focused on the second signal surface.

Thereafter, the control section 20 changes the setting value of the SA parameter from the intermediate value Sm to the second reference value S1. In response to this, the collimator lens driver 33b moves the position of the collimator lens 33a to the position corresponding to the second reference value S1. Upon the completion of the movement of the collimator lens 33a (time t4), the control section 20 turns on the tracking servo signal to start the tracking servo control. Therefore, the focus position of the objective lens 36 is controlled to a position at which information can be read from the second signal surface.

If the second reference value S1 is the optimum value of the SA parameter when information is read from the second signal surface, reading from the second signal surface can be immediately started in this state. However, there is a possibility that the optimum value of the SA parameter has changed from the second reference value S1 due to the influence of temperature rise and so forth during the use of the optical disc device 1. For this reason, the control section 20 executes the adjustment processing of the SA parameter anew in this example.

Specifically, first the control section 20 carries out information reading from the optical disc medium M in the state in which the second reference value S1 is set, and measures the evaluation value (in this example, RF amplitude) relating to the accuracy of this reading (first-round measurement). Next, the control section 20 changes the setting value of the SA parameter by a predetermined amount. Then, upon the completion of the movement of the collimator lens 33a according to this change (time t5), the control section 20 carries out second-round measurement of the evaluation value. Moreover, the control section 20 changes the SA parameter to another value. Upon the completion of the movement of the collimator lens 33a according to this change (time t6), the control section 20 carries out third-round measurement of the evaluation value.

When the three times of measurement are finished and three sampling data are obtained, the control section 20 carries out a quadratic curve approximation like the above-described one by using these sampling data and calculates the optimum value So of the SA parameter at the present timing (time t7). Then, the control section 20 changes the setting value of the SA parameter to the calculated optimum value So. Upon the completion of the movement of the collimator lens 33a to the position corresponding to this optimum value So (time t8), information reading from the second signal surface is started.

In the above description, it takes a certain amount of time (time t4 to time t8) to execute the adjustment processing of the SA parameter. In particular, the movement and stop of the collimator lens 33a are repeated plural times in execution of the adjustment processing. It takes a long time to carry out control accompanied by such physical movements of the collimator lens 33a. To address this, instead of measuring the evaluation value after the collimator lens 33a is moved to a specific position and stopped, the optical disc device 1 according to the present embodiment measures the evaluation value in the midst of the movement of the collimator lens 33a to thereby attempt to shorten the time of the adjustment processing.

Figure 5:
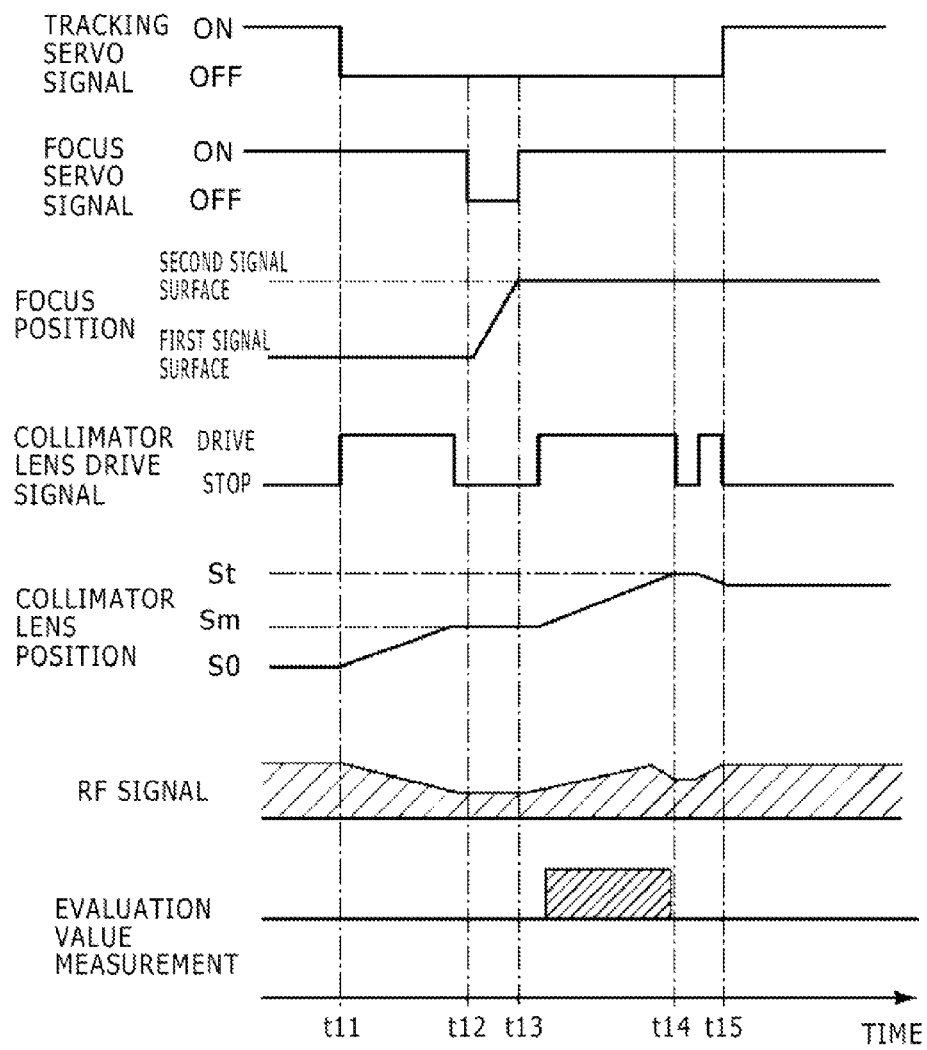
FIG. 5 is a diagram showing one example of the data recording layer change control carried out by the optical disc device according to the embodiment.

A specific example of the data recording layer change control in the present embodiment will be described below by using FIG. 5. This control is implemented through control of the respective units by the control section 20 in accordance with a program stored in the storage element. This program may be so provided as to be stored in an information storage medium readable by various kinds of computers.

First, control from time t11 to time t13 is the same as that of the related art from the time t1 to the time t3. Specifically, the control section 20 turns off the tracking servo signal (time t11) and moves the position of the collimator lens 33a to the position corresponding to the intermediate value Sm (initial position). Then, the control section 20 starts a focus jump (time t12) and turns on the focus servo signal at the timing when the objective lens 36 is focused on the second signal surface (time t13).

Thereafter, differently from the example of FIG. 4, the control section 20 changes the setting value of the SA parameter from the intermediate value Sm to a target value St. The target value St is decided according to a data recording layer newly selected as the reading target. Suppose that, in this example, the target value St is decided by adding a given offset value to a reference value corresponding to the data recording layer as the reading target as a specific example. That is, the target value St is calculated as St=(S1+α), where α is an offset value. To decide the offset value α, how much the optimum value So of the SA parameter varies from the second reference value S1 due to temperature change and so forth is examined in advance. The offset value α is set to a value decided in consideration of the amount of variation. That is, a magnitude of α is so decided that the optimum value So when reading is performed from the second signal surface satisfies a relationship of Sm<So<(S1+α). Due to this, when the collimator lens 33a moves to a position corresponding to the target value St, the collimator lens 33a passes through a position at which the spherical aberration of the objective lens 36 is corrected and the quality of information reading from the second signal surface is the highest.

Furthermore, in the present embodiment, in the period until the timing when the movement of the collimator lens 33a to the position corresponding to the target value St is completed (time t14), the evaluation value is repeatedly measured concurrently with the movement of the collimator lens 33a. That is, in the present embodiment, the measurement is performed while the on-state of the collimator lens drive signal continues. Therefore, the evaluation value is measured not in the state in which the collimator lens 33a is stopped but in the midst of the movement of the collimator lens 33a (in the midst of change in the amount of spherical aberration of the objective lens 36). Specifically, during the movement of the collimator lens 33a, the recording signal processor 19 performs measurement (sampling) of the RF amplitude at predetermined time intervals. In FIG. 5, the plural times of measurement consecutively performed are represented by one rectangle. The control section 20 calculates the optimum value So based on the plural values of the RF amplitude obtained by this measurement in the period from the time t13 to t14. In this example, differently from the example of FIG. 4, the tracking servo signal is not yet turned on when the evaluation value is measured. That is, the objective lens 36 does not follow a track of the optical disc medium M. Therefore, as the evaluation value, not a jitter value relating to a rising timing of the signal waveform at the time of information reading but the RF amplitude is used.

After the optimum value So is calculated, the control section 20 changes the setting value of the SA parameter to the calculated optimum value So. In response to this, the collimator lens 33a moves to the position corresponding to the optimum value So. Upon the completion of the movement, the control section 20 turns on the tracking servo signal and starts information reading from the second signal surface (time t15).

Figure 6:
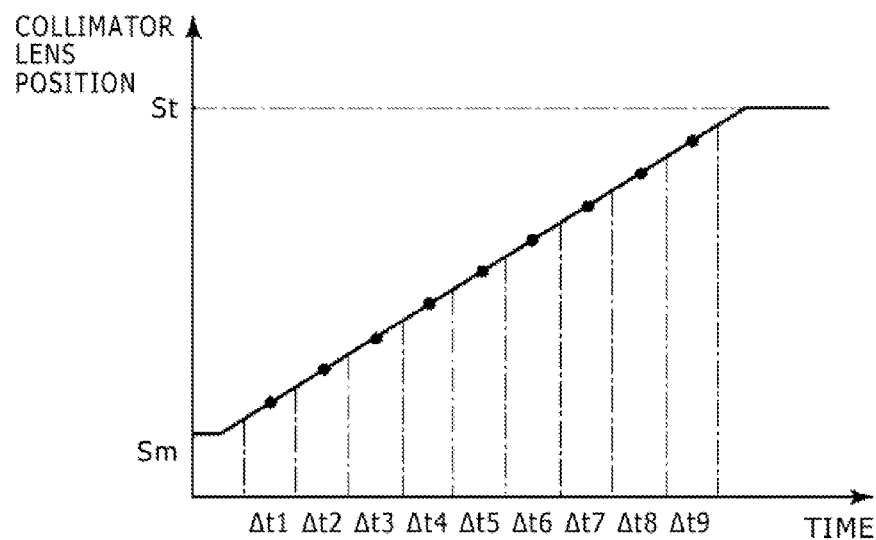
FIG. 6 is a diagram showing time change of a collimator lens position.

A specific example of the processing of calculating the optimum value So by the control section 20 will be described below. FIG. 6 shows change in the position of the collimator lens 33a during the period in which the evaluation value is measured. As shown in this diagram, the collimator lens 33a moves toward a constant direction at a substantially constant speed from the position corresponding to the intermediate value Sm to the position corresponding to the target value St (target position). The control section 20 divides this period, in which measurement is performed during the movement of the collimator lens 33a, into plural unit periods. As one example, the whole measurement period is divided into nine unit periods Δt1 to Δt9 in FIG. 6.

Figure 7:
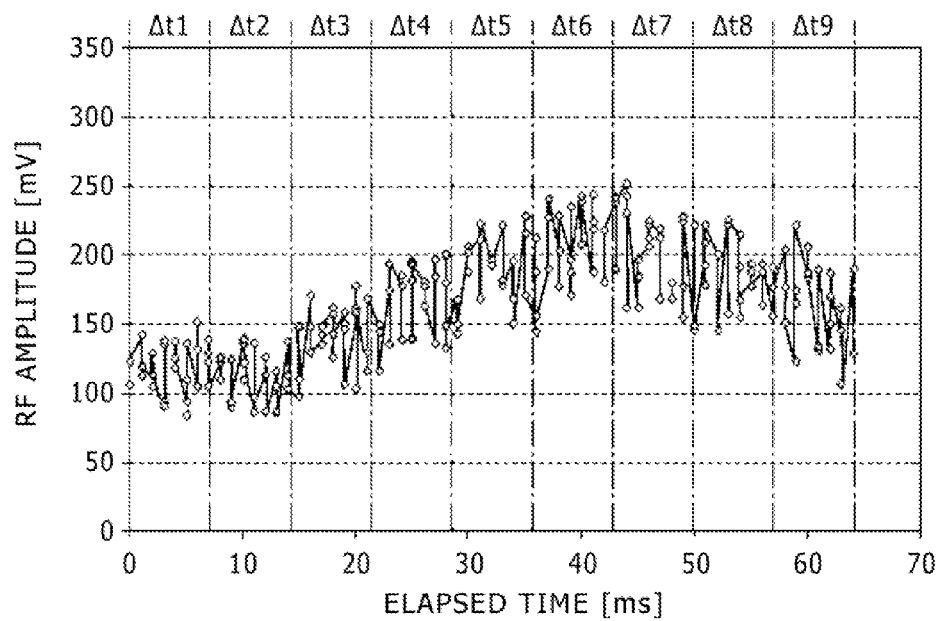
FIG. 7 is a diagram showing one example of a measurement result of the evaluation value.

FIG. 7 is a diagram showing one example of the measurement result of the evaluation value (RF amplitude). In the present embodiment, because the measurement is performed without stopping the movement of the collimator lens 33a, the evaluation value can be measured many times at comparatively short time intervals as shown in FIG. 7. However, variation is caused in the measurement result due to e.g. factors that this measurement is performed in the state in which the tracking servo control is not carried out and that this measurement is performed while the collimator lens 33a is moved.

Therefore, for each unit period, the control section 20 calculates a representative value of plural evaluation values obtained by measurement in the unit period. The representative value may be e.g. an average of the plural evaluation values. Alternatively, the following way may be employed. Specifically, the plural evaluation values obtained in one unit period are further divided into plural groups and the maximum value of the evaluation value in each group is acquired.

Then, the representative value is calculated by using these maximum values of the evaluation value. As a specific example, suppose that (N×M) times of measurement are performed in one unit period. In this case, every time N measurement results are obtained, the control section 20 selects the maximum value among these N measurement results. This results in achievement of M maximum values per one unit period. The control section 20 employs an average of the M maximum values as the representative value of the measurement result in the corresponding unit period. By statistically processing plural evaluation values on each unit period basis and calculating the representative value in this manner, variation in the measurement can be absorbed. Furthermore, according to the method of acquiring the maximum value of N measurement results as described above, the evaluation values obtained in the state in which the measurement condition is favorable can be extracted and used for the calculation of the representative value.

In the calculation of the representative value, the control section 20 may exclude a measured value greatly different from other measured values as an abnormal value. For example, among plural measured values obtained in one unit period, a measured value having an extraordinarily large value relative to the other measured values is excluded as an abnormal value, and the representative value is calculated by using the other measured values.

Figure 8:
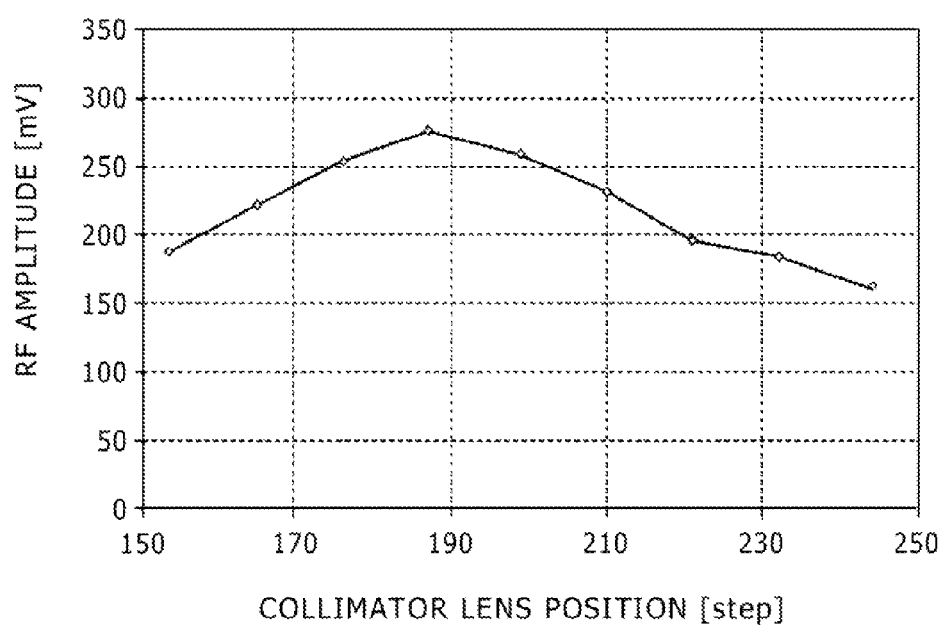
FIG. 8 is a diagram showing one example of a relationship between the collimator lens position and the evaluation value.

After the representative value of the evaluation value of each unit period is calculated, the control section 20 calculates the optimum value So by using these representative values. Specifically, about each unit period, the control section 20 identifies a center position of a movement range of the collimator lens 33a in the unit period. Dots on the graph of FIG. 6 indicate the identified center positions of the collimator lens 33a in the respective unit periods. Then, the control section 20 associates the values of the SA parameter corresponding to the identified center positions with the representative values of the evaluation value calculated about the corresponding unit periods. That is, the control section 20 calculates the optimum value So based on an assumption that the representative value of the evaluation value is obtained by measurement in the state in which the collimator lens 33a is located at the center position. FIG. 8 is a diagram showing one example of a relationship between the center position of the collimator lens 33a in each unit period and the representative value of the evaluation value. In this diagram, nine representative values of the evaluation value are plotted corresponding to nine unit periods. The optimum value So is calculated by performing a quadratic curve approximation similar to that in the case of normal adjustment processing for these nine measurement data.

Figure 9:
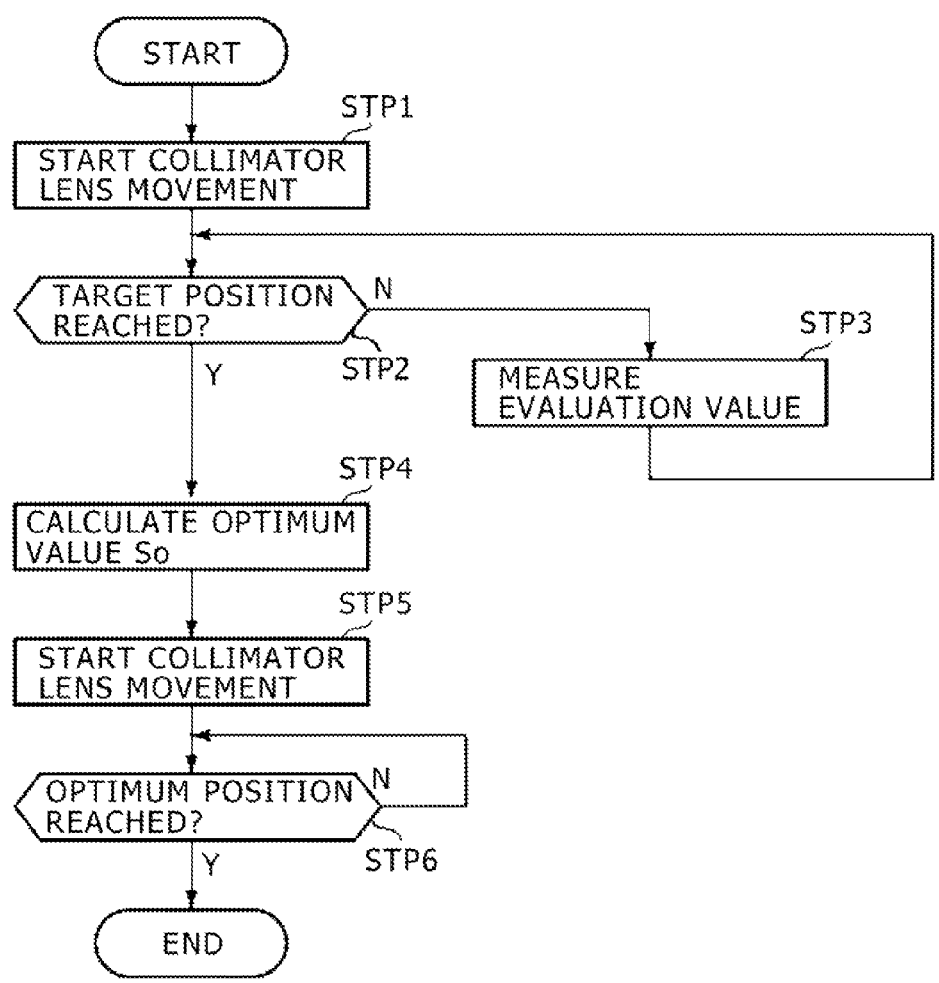
FIG. 9 is a flow diagram showing one example of a flow of SA parameter adjustment processing executed by the optical disc device according to the embodiment.

A flow of the SA parameter adjustment processing described above will be described below by using a flow diagram of FIG. 9.

First, the control section 20 starts drive control to move the collimator lens 33a to the position corresponding to the target value St (target position) (STP1). Then, the control section 20 determines whether the collimator lens 33a has reached the target position (STP2). If it has not reached the target position, the control section 20 measures the RF amplitude (STP3) and temporarily stores the measurement result in the storage element in the control section 20. Thereafter, the control section 20 returns to STP2 to determine whether the collimator lens 33a has reached the target position. Due to this, the measurement of the RF amplitude is repeatedly performed in the period until the collimator lens 33a reaches the target position.

If it is determined in STP2 that the collimator lens 33a has reached the target position, the control section 20 calculates the optimum value So by statistical processing like the above-described one by using plural measurement results of the RF amplitude obtained in STP3 (STP4). After completing the calculation of the optimum value So, the control section 20 starts drive control to move the collimator lens 33a to the position corresponding to the optimum value So (optimum position) (STP5). Then, the control section 20 determines whether the collimator lens 33a has reached the optimum position (STP6) and ends the processing if it has reached the optimum position.

According to the above-described optical disc device 1 in accordance with the present embodiment, while the amount of spherical aberration of the objective lens 36 is changed by the spherical aberration correction mechanism 33, the evaluation value is measured concurrently with the changing. Thus, plural times of measurement can be rapidly performed compared with the case of measuring the evaluation value in the state in which the amount of spherical aberration is fixed. This can shorten the time it takes to execute the adjustment processing of the SA parameter when the data recording layer as the reading target is changed. In particular, when the data recording layer change control is carried out, because a focus jump is executed in the state in which the SA parameter is set to the intermediate value Sm, the SA parameter is changed to a value suitable for the signal surface from which information is newly read after the focus jump is executed. Therefore, the time it takes to carry out the data recording layer change control can be shortened by measuring the evaluation value concurrently with the movement of the collimator lens 33a due to this change in the SA parameter.

Embodiments of the present disclosure are not limited to the one described above. For example, the above description is made about an SA parameter adjustment control carried out when the data recording layer as the reading target is changed. However, also in other cases, the SA parameter adjustment control may be carried out in a similar procedure. Specifically, also in initial adjustment processing carried out when the new optical disc medium M is set in the device, the optical disc device 1 may execute the adjustment processing of the SA parameter in procedure similar to the above-described one. Also in this case, after focus detection is carried out in the state in which the intermediate value Sm is set, the value of the SA parameter is changed to a value suitable for the signal surface on which the focus is set. Therefore, the initial adjustment processing can be executed in a short time by measuring the evaluation value concurrently with the movement of the collimator lens 33a accompanying this change in the SA parameter.

In the above description, measurement is performed while the collimator lens 33a is moved to the position corresponding to the target value St settled in advance. However, how far the collimator lens 33a is to be moved may be undecided in advance. In this case, the evaluation value is measured concurrently with the movement of the collimator lens 33a and, every time a predetermined number of evaluation values are obtained or every time a predetermined period elapses, the control section 20 executes statistical processing on the plural evaluation values obtained thus far to calculate the representative value thereof. Then, when the calculated representative value shows a change such as a transition from increase to decrease, the collimator lens 33a is estimated to have passed through the position corresponding to the optimum value So. Thus, the control section 20 stops the movement of the collimator lens 33a and calculates the optimum value So by using the representative value obtained thus far.

Although the RF amplitude is used as the evaluation value of the reading accuracy in the above description, e.g. the tracking error signal or the pull-in signal may be used as the evaluation value.

The present disclosure contains subject matter related to that disclosed in Japanese Priority Patent Application JP 2013-235488 filed in the Japan Patent Office on Nov. 13, 2013, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disc device that reads information recorded in an optical disc medium, the optical disc device comprising:
   an objective lens configured to focus light on the optical disc medium;
   a spherical aberration correction mechanism configured to change an amount of spherical aberration of the objective lens according to a setting value of a predetermined parameter;
   an evaluation value measurement section configured to measure an evaluation value indicating accuracy of reading of information from the optical disc medium; and
   a control section configured to execute adjustment processing in which the control section carries out a plurality of times of measurement of the evaluation value by the evaluation value measurement section concurrently with changing the amount of spherical aberration of the objective lens by the spherical aberration correction mechanism and calculates an optimum setting value of the parameter based on a plurality of evaluation values obtained by the plurality of times of measurement; wherein
   the plurality of times of measurement of the evaluation value by the evaluation value measurement section is performed while an on-state of a collimator lens drive signal continues and while the collimator lens moves toward a constant direction; and wherein
   a tracking servo control signal of the optical disc device is turned off from the first of the plurality of times of measurement of the evaluation value through to the calculation of the optimum setting value of the parameter.

2. The optical disc device according to claim 1, wherein the optical disc medium includes a plurality of data recording layers, and
   the control section executes the adjustment processing when a data recording layer as a reading target among the plurality of data recording layers is changed.

3. The optical disc device according to claim 2, wherein the control section carries out measurement of the evaluation value while changing the amount of spherical aberration of the objective lens toward a target value decided depending on the data recording layer newly selected as the reading target.

4. The optical disc device according to claim 1, wherein the control section divides a period in which the evaluation value is measured into a plurality of unit periods and, for each of the plurality of unit periods, calculates a representative value of a plurality of evaluation values obtained by measurement in the unit period, and
   the control section calculates the optimum setting value based on the representative values obtained on each unit period basis.

5. A control method of an optical disc device including
   an objective lens that focuses light on an optical disc medium,
   a spherical aberration correction mechanism that changes an amount of spherical aberration of the objective lens according to a setting value of a predetermined parameter, and
   an evaluation value measurement section that measures an evaluation value indicating accuracy of reading of information from the optical disc medium,
   the control method comprising:
   carrying out a plurality of times of measurement of the evaluation value by the evaluation value measurement section concurrently with changing the amount of spherical aberration of the objective lens by the spherical aberration correction mechanism; and
   executing adjustment processing in which an optimum setting value of the parameter is calculated based on a plurality of evaluation values obtained by the plurality of times of measurement; wherein
   the plurality of times of measurement of the evaluation value by the evaluation value measurement section is performed while an on-state of a collimator lens drive signal continues and while the collimator lens moves toward a constant direction; and wherein
   a tracking servo control signal of the optical disc device is turned off from the first of the plurality of times of measurement of the evaluation value through to the calculation of the optimum setting value of the parameter.

6. A microprocessor operating under the control of an executable program to control an optical disc device including
   an objective lens that focuses light on an optical disc medium,
   a spherical aberration correction mechanism that changes an amount of spherical aberration of the objective lens according to a setting value of a predetermined parameter, and
   an evaluation value measurement section that measures an evaluation value indicating accuracy of reading of information from the optical disc medium,
   the program for a computer, comprising:
   carrying out a plurality of times of measurement of the evaluation value by the evaluation value measurement section concurrently with changing the amount of spherical aberration of the objective lens by the spherical aberration correction mechanism; and
   executing adjustment processing in which an optimum setting value of the parameter is calculated based on a plurality of evaluation values obtained by the plurality of times of measurement; wherein
   the plurality of times of measurement of the evaluation value by the evaluation value measurement section is performed while an on-state of a collimator lens drive signal continues and while the collimator lens moves toward a constant direction; and wherein
   a tracking servo control signal of the optical disc device is turned off from the first of the plurality of times of measurement of the evaluation value through to the calculation of the optimum setting value of the parameter.

7. A non-transitory computer-readable information storage medium for storing a program, comprising
   the program controlling an optical disc device including
   an objective lens that focuses light on an optical disc medium, a spherical aberration correction mechanism that changes an amount of spherical aberration of the objective lens according to a setting value of a predetermined parameter, and an evaluation value measurement section that measures an evaluation value indicating accuracy of reading of information from the optical disc medium, the program for a computer, including:

carrying out a plurality of times of measurement of the evaluation value by the evaluation value measurement section concurrently with changing the amount of spherical aberration of the objective lens by the spherical aberration correction mechanism; and executing adjustment processing in which an optimum setting value of the parameter is calculated based on a plurality of evaluation values obtained by the plurality of times of measurement; wherein the plurality of times of measurement of the evaluation value by the evaluation value measurement section is performed while an on-state of a collimator lens drive signal continues and while the collimator lens moves toward a constant direction; and wherein a tracking servo control signal of the optical disc device is turned off from the first of the plurality of times of measurement of the evaluation value through to the calculation of the optimum setting value of the parameter.

* * * * *